(12) United States Patent
Sato

(10) Patent No.: US 6,466,866 B1
(45) Date of Patent: Oct. 15, 2002

(54) ROUTE GUIDANCE DEVICE

(75) Inventor: Hiroyuki Sato, Fujisawa (JP)

(73) Assignee: Xanavi Informatics Corporation, Zama (JP)

(*) Notice: Subject to any disclaimer, the term of this patent is extended or adjusted under 35 U.S.C. 154(b) by 0 days.

(21) Appl. No.: 09/914,271

(22) PCT Filed: Feb. 25, 2000

(86) PCT No.: PCT/JP00/01111

§ 371 (c)(1),
(2), (4) Date: Dec. 3, 2001

(87) PCT Pub. No.: WO00/50845

PCT Pub. Date: Aug. 31, 2000

(30) Foreign Application Priority Data

Feb. 25, 1999 (JP) .......................................... 11-047945

(51) Int. Cl.⁷ ............................................. G06F 165/00
(52) U.S. Cl. ..................... 701/209; 73/178 R; 340/990; 340/995; 701/200
(58) Field of Search ................................ 701/209, 210, 701/200, 205; 340/990, 995; 73/178 R

(56) References Cited

U.S. PATENT DOCUMENTS 5,504,482 A  4/1996  Schreder
5,552,990 A  9/1996  Ihara et al.
5,821,880 A  10/1998  Morimoto et al.
5,928,307 A * 7/1999  Oshizawa et al. .......... 340/995

FOREIGN PATENT DOCUMENTS

EP           811960        12/1997

* cited by examiner

Primary Examiner—William A. Cuchlinski, Jr.
Assistant Examiner—Olga Hernandez
(74) Attorney, Agent, or Firm—Antonelli, Terry, Stout & Kraus, LLP.

(57) ABSTRACT

Frequent execution of auto-rerouting in the vicinity of a junction where a current-position skipping of a vehicle due to map-matching is likely to occur is prevented.

When the current position of the vehicle calculated by a current position calculating unit 11 is in the vicinity of a junction on a recommended route set by the route searching unit 13 and even if the current position of the vehicle is off the recommended route as a result of correction by a map matching unit 12, a route guidance unit 132 does not request a route searching unit 131 to search a newly recommended route extending from the corrected current position of the vehicle to a destination.

4 Claims, 5 Drawing Sheets

(a)

(b)

ROUTE GUIDANCE DEVICE

TECHNICAL FIELD

The present invention relates to a technology for calculating a recommended route from a starting point to a destination, and suggesting it to a user in an on-board navigation device or the like.

BACKGROUND OF THE INVENTION

In an on-board navigation device, a technology (a route guidance) has been already put into a practical use, which searches a recommended route from a set starting point to a set destination based on road map data, and guides a vehicle to reach the destination on the recommended route by using a display device, a voice output device and the like.

In the route guidance technology, all routes connecting the set staring point with the set destination are searched by using road map data, and a technology called a dijkstra method searches for a route of minimum cost (for example, the gross distance of the route), thereby setting the searched route as the recommended route. And, for example, the set recommended route is displayed while overlapping a displayed map, and information to be required (for example, information such as whether or not to turn the next intersection) for a vehicle to run on the recommended route is informed via voice. In a case when the vehicle deviates from the recommended route during the route guidance, a recommended route to the destination is searched again, taking the current position of the vehicle as a starting point, and the re-searched route is newly set as the recommended route (an auto-rerouting).

In addition, in an on-board navigation device, in order to position a vehicle on a road in a displayed map, a technology (a map matching) has already been put into a practical use, wherein the current position of the vehicle, determined by various kinds of sensors such as gyro, a running vehicle speed sensor and the like, or GPS receiver, is corrected every specified running distance (for example, 20 meters).

In this map matching technology, the current position of the vehicle, determined by various kinds of sensors such as the running vehicle speed sensor, a gyro or the like, and a GPS receiver, is regarded as a center. Then, all positions corresponding to the current position on the road within a specified range are registered as candidate positions, the specified range being set by the searched current vehicle position, errors included in a traveling direction, and errors of road map data. Then, a current vehicle position is corrected to a candidate position which has the strongest correlation with the current position, in consideration for a distance from a current position to the candidate position; a difference between a vehicle traveling direction, searched by various kinds of sensors such as the vehicle speed sensor, the gyro or the like and the GPS receiver or the like, and a azimuth of road in which a candidate position is set; and a road having the current position of the vehicle corrected by the previous map matching.

DISCLOSURE OF THE INVENTION

Incidentally, in the on-board navigation apparatus to which the foregoing map matching technology is applied, in the case where the plurality of candidate positions are registered, the current position corrected by the map matching at this time is set on a road different from the road with the current position corrected by the previous map matching being set therein (a so-called position skipping). Hereinbelow, a description will be made for this position skipping phenomenon with reference to drawings.

FIG. 5 is a view for explaining the position skipping phenomenon in the on-board navigation apparatus to which the map matching technology is applied. Here, FIG. 5(a) shows an actual road, and FIG. 5(b) shows a shape of a road determined by the road map data corresponding to the road shown in FIG. 5(a).

Now, in FIG. 5(a), it is assumed that the vehicle changes a lane before a junction A and goes straight, then the map matching is performed immediately after the vehicle passes the junction A. In this case, according to the foregoing map matching technology, a position B on a main lane and a position C on a branch lane, which are shown in FIG. 5(b), are registered as candidate positions, both having strong and uncomparable correlations with the current position of the vehicle determined by various kinds of sensors such as a vehicle speed sensor and a gyro, or a GPS receiver and the like. However, when a difference between a traveling direction of the vehicle, searched by the various kinds of sensors such as the vehicle speed sensor and the gyro, or the GPS receiver and the like, and an azimuth of each road in which the candidate position is set is considered, there is a strong possibility that not the candidate position on the branch lane where the vehicle actually runs but the candidate position B on the main lane is selected as a current position after correction.

Here, it is assumed that the current position is corrected to the candidate position B by the map matching, further the vehicle runs thereon. Then, it is assumed that map matching is performed when the vehicle reaches a point D on the branch lane. Also in this case, a position E on the main lane and a position F on the branch lane, which are shown in FIG. 5(b), are registered as candidate positions. However, in consideration for a distance from the current position of the vehicle to the candidate position thereof, which is determined by the various kinds of sensors such as the vehicle speed sensor and the gyro or the GPS receiver and the like; or for a difference between the traveling direction of the vehicle, determined similarly to the above by the various kinds of sensors such as the vehicle speed sensor and the gyro or the GPS receiver and the like, and an azimuth of each road where the candidate position is set, there is a strong possibility that the candidate position F on the branch lane is selected as a current position after correction.

Here, if it is assumed that the current position is corrected to the candidate position F by the map matching, the current position being displayed on the display device is suddenly skipped from the main lane onto the branch lane at the point D. This position skipping phenomenon has a possibility of continuing until a relative distance between the main lane and the branch lane or a difference in shapes between the main lane and the branch lane are made apparent.

Now, when the route guidance technology equipped with the above-described auto-rerouting function is further applied to the on-board navigation apparatus to which the map matching technology involving the position skipping phenomenon as described above is applied, a problem to be described below occurs.

Now, in FIGS. 5(a) and 5(b), it is assumed that a route connecting the main lane through the junction A to the branch lane is selected as a recommended route, and that the route guidance is made so that the vehicle may run on the route. Here, as described above, in the case where the vehicle changes the lane before the junction A and goes straight to pass the junction A, leading to the correction of the current position to the candidate position B on the main lane by the map matching, it results in that the vehicle deviates from the recommended route during the route guidance, thus the auto-rerouting is executed. Specifically, the corrected current position B is set as starting point, a recommended route to the destination is searched again, and the re-searched route is newly set as a recommended route. Thus, the route guidance is performed.

Moreover, as described above, in the case where the map matching is performed when the vehicle reaches the point D on the branch lane, and as a result, the current position is corrected to the candidate position F on the branch lane, it results in that the vehicle deviates from the recommended route searched again by the previous auto-rerouting. Accordingly, the auto-rerouting is executed again. Specifically, the corrected current position F is set as a starting point, a recommended route to the destination is searched again, and the re-searched route is newly set as a recommended route. Thus, the route guidance is performed.

As described above, when the route guidance technology equipped with the auto-rerouting function is applied to the on-board navigation apparatus to which the map matching technology is applied, the auto-rerouting is executed every time when the current position is subjected to the position skipping, and a different recommended route is submitted to the user, which is awfully troublesome.

The present invention was made with the foregoing circumstance in mind. An object of the present invention is to prevent the execution of the auto-rerouting every time when the position skipping is made in a route guidance device such as the on-board navigation apparatus to which the map matching technology is applied.

In order to solve the foregoing subject, the present invention is a route guidance device, in which a recommended route from a set starting point to a set destination is searched to be submitted to a user; and when a current position of a vehicle deviates from the recommended route, a recommended route from the current position of the vehicle to the destination is newly searched to be submitted to the user, the route guidance device comprising:

data storing means for storing road map data;

current position measuring means for measuring a current position of a vehicle;

map matching means for correcting the current position of the vehicle measured, for each specified interval, by the current position measuring means so as to be located on any road in a specified range from the current position among roads determined by the road map data stored in the data storing means; and auto-rerouting preventing means for preventing a search for a new recommended route from a corrected current position of the vehicle to the destination even if the current position of the vehicle is corrected by the map matching means and deviates from the recommended route resultantly when the current position of the vehicle measured by the current position measuring means is in the vicinity of a junction on the recommended route among the roads determined by the road map data stored in the data storing means.

Here, a judgment as to whether or not the current position of the vehicle measured by the current position measuring means is in the vicinity of the junction on the recommended route among the roads determined by the road map data stored in the data storing means may be performed, for example, in the following manner. Specifically, information regarding the junctions is previously set in the road map data stored in the data storing means, and among the junctions stored in the data storing means, the junction on the recommended route, which is proximate to the current position of the vehicle measured by the current position measuring means, is searched. Then, investigation is made as to whether or not the current position of the vehicle exists within a specified distance from the junction in the traveling direction of the vehicle (for example, the distance is within 1000 m in the case where the recommended route is a highway, and is within 400 m in the case where the recommended route is an open road).

Alternatively, the judgment may be made by investigating whether or not the vehicle moves for a specified distance after the number of roads selected to be within a specified range from the current position of the vehicle measured by the current position measuring means is increased in the map matching. means. In this case, when a value determined by the running distance of the vehicle after it is judged that the current position of the vehicle is in the vicinity of the junction on the recommended route and the azimuth difference among a plurality of roads selected to be within the specified range from the current position of the vehicle measured by the current position measuring means in the map matching means exceeds a predetermined reference value, the current position of the vehicle is corrected by the map matching means, and as a result, the prevention of the search for a new recommended route from the corrected current position of the vehicle to the destination in the case where the vehicle deviates from the recommended route may be released.

According to the present invention, by the foregoing configuration, in the case where the vehicle is located in the vicinity of the junction where there is a strong possibility that the position skipping occurs due to the map matching, the search for the new recommended route from the current position of the vehicle to the destination is prevented even in the case where the vehicle deviates from the recommended route. Therefore, a situation such that the auto-rerouting is executed every time when the current position is subjected to the position skipping, and a different recommended route is submitted to the user can be prevented from occurring.

BEST MODE FOR PERFORMING THE PRESENT INVENTION

Hereafter, a description will be made with an example in which a first embodiment of the present invention is applied to an on-board navigation device.

Figure 1:
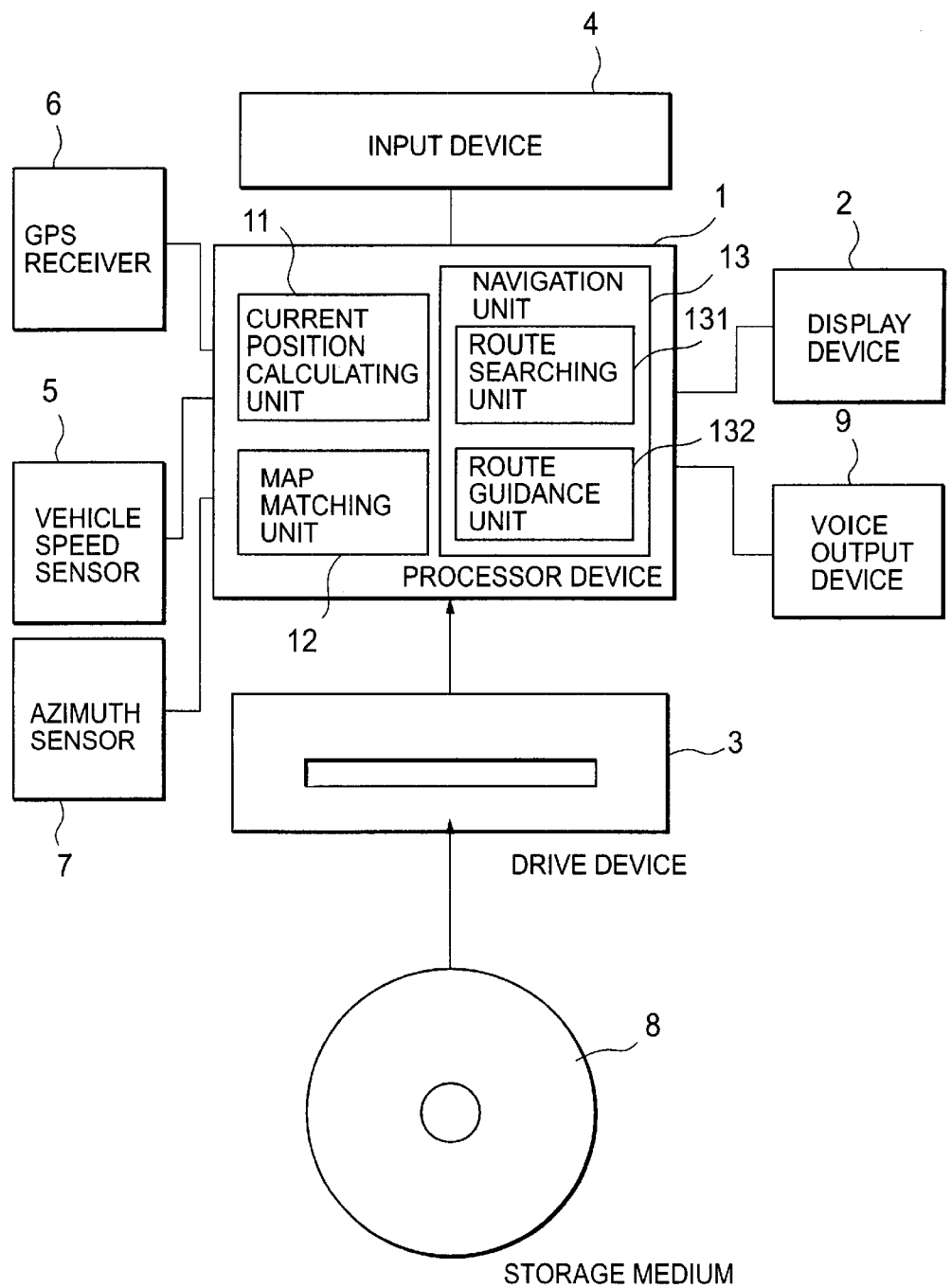
FIG. 1 is a schematic constitutional view of a navigation device to which a first embodiment of the present invention is applied.

FIG. 1 is a schematic constitutional view of a navigation device to which a first embodiment of the present invention is applied.

As shown in the drawing, a navigation device of the present embodiment comprises a processor device 1 consisting of a micro processor and a memory; a display device 2 such as a liquid crystal display; a drive device 3 for accessing a storage medium 8 such as a CD-ROM with map data recorded therein and for reading data; an input device 4 for receiving instructions from users; a vehicle speed sensor 5 for detecting a vehicle speed by the revolving number of a tire per unit time; a GPS receiver 6 for making GPS data and sequentially outputting the data; an azimuth sensor 7 such as a geomagnetic sensor and a gyro for measuring an azimuth of a vehicle; and a voice output device 9. The GPS receiver, specifically, receives signals issued from at least three GPS satellites; measures a distance to each satellite and change rates of the distances every specified time (for example, one second); makes data including a current position of a vehicle, a speed, and a traveling direction (an azimuth) by the obtained result; and outputs the data sequentially.

In this embodiment, the display device 2, the drive device 3, the input device 4, the vehicle speed sensor 5, the GPS receiver 6, the azimuth sensor 7, and the voice output device 9 are the same as those having been conventionally used for navigation devices.

The processor device 1 realizes a current position calculating unit 11, a map matching unit 12, and a navigation unit 13 as a process by micro-processor which runs a specified program on a memory. Note that, the specified program may be previously stored in the memory, or may be loaded in the memory from the storage medium 8 such as a CD-ROM via the drive device 3.

The current position calculating unit 11 sequentially calculates a current position of a vehicle and a traveling direction thereof based on GPS data sequentially outputted from the GPS receiver 6 every specified time (for example, one second), and data measured by the various kinds of sensors 5 and 7. These processes in the current position calculating unit 11 are the same as the current position calculating processes of the vehicle performed in the conventional navigation device.

The map matching unit 12, regarding the current vehicle position searched at the current position calculating unit 11 as a center, every specified distance (for example 20 m), takes out information from the map data read out by the navigation unit 13 (to be described later), the information being relative to all roads within a specified range determined by errors included in the current position or the traveling direction of the vehicle and errors of the map data. Subsequently, a position corresponding to the current position on each road, which was taken out, is registered as a candidate position. Then, in consideration for a distance from the current position to each candidate position; a difference between the vehicle traveling direction, searched at the current position calculating unit 11, and a azimuth of a road in which each candidate position is set; and a road having the current position of the vehicle which is corrected by the previous map matching, the current position of the vehicle searched by the current position calculating unit 11 is corrected to a candidate position which has the strongest correlation with the current position. These processes in the map matching unit 12 are the same as the map matching processes performed in the conventional navigation device.

The navigation unit 13, from the storage medium 8 via the drive device 3, reads map data in the vicinity of the current position of the vehicle obtained by the current position calculating unit 11 or the map matching unit 12, and displays a map according to the data on the display device 2. In addition, the navigation unit 13 also displays a mark which expresses the current position and the traveling direction of the vehicle searched by the current position calculating unit 11 or the map matching unit 12 on the displayed map while overlapping the mark thereon.

Moreover, the navigation unit 13 comprises a route searching unit 131 and a route guidance unit 132 as a processor device for a route guidance.

The route searching unit 131 searches, by using the map data stored in the storage medium 8, all routes connecting a starting point with a destination, which are received from an operator via the input device 4. Thereafter, for example, by a technology called a dijkstra method, a route of minimum cost (for example, the gross distance of the route) is searched and set as a recommended route (a route searching). In addition, when the vehicle deviates from the recommended route during the route guidance by the route guidance unit 132 (to be described later), a recommended route to a destination is searched again, taking the current position of the vehicle obtained by the current position calculating unit 11 or the map matching unit 12 as a new starting point. Then, the re-searched route is newly set as a recommended route (an auto-rerouting). The route searching and the auto-rerouting processes, described above, are the same as route searching and auto-rerouting processes performed in the conventional navigation device.

The route guidance unit 132, by using the display device 2 and the voice output device 9, guides the vehicle to reach the destination on the recommended route set by the route searching unit 131. For example, the route guidance unit 132 displays the recommended route set by the route searching unit 131 on the displayed map while overlapping the recommended route thereon, and informs the information required for the vehicle to run on the recommended route (for example, information such as whether or not to turn the next intersection) via voice (a route guidance).

Moreover, when the current position of the vehicle obtained by the map matching unit 12 deviates form the recommended route set by the route searching unit 131, the route guidance unit 132 instructs the route searching unit 131 for auto-rerouting, obtains a new recommended route from the route searching unit 131, and performs the foregoing route guidance according to the route. However, when the current position of the vehicle searched by the current position calculating unit 11 is in the vicinity of a junction on the recommended route, the route guidance unit 132 does not instruct the route searching unit 131 for auto-rerouting as a result of a correction of the current position of the vehicle by the map matching unit 12, even if the current position of the vehicle deviates from the recommended route. By performing this, an auto-rerouting in the vicinity of the junction on the recommended route is prohibited.

Herein, a judgement of whether or not the current position of the vehicle searched by the current position calculating unit 11 approaches in the vicinity of the junction on the recommended route will be performed as below.

Specifically, when the number of candidate positions registered in the map matching unit 12 is increased, since it indicates that the number of roads within a specified range is increased more than the number of the current position of the vehicle searched by the current position calculating unit 11, the possibility of the vehicle approaching the junction is high. Thus, when the number of candidate positions registered in the map matching unit 12 is increased, it is judged that the current position of the vehicle approaches in the vicinity of. the junction on the recommended route.

On the other hand, a judgement of whether or not the current position of the vehicle searched by the current position calculating unit 11 is off the vicinity of the junction on the recommended route may be determined by, for example, searching a running distance (for example, a moving distance of the current position of the vehicle which is sequentially calculated by the current position calculating unit 11) after it is judged that the current position of the vehicle obtained by the current position calculating unit 11 approaches in the vicinity of the junction on the recommended route. Specifically, in the case where the recommended route is set on a high way, when the vehicle runs 1000 meters, alternatively, in the case where the recommended route is set on the open road, when the vehicle runs 400 meters, it may be judged that the current position of the vehicle is off the vicinity of the junction on the recommended route.

Next, a description will be made for an operation of the navigation device, to which the first embodiment of the present invention is applied, with the above-described constitution.

Figure 2:
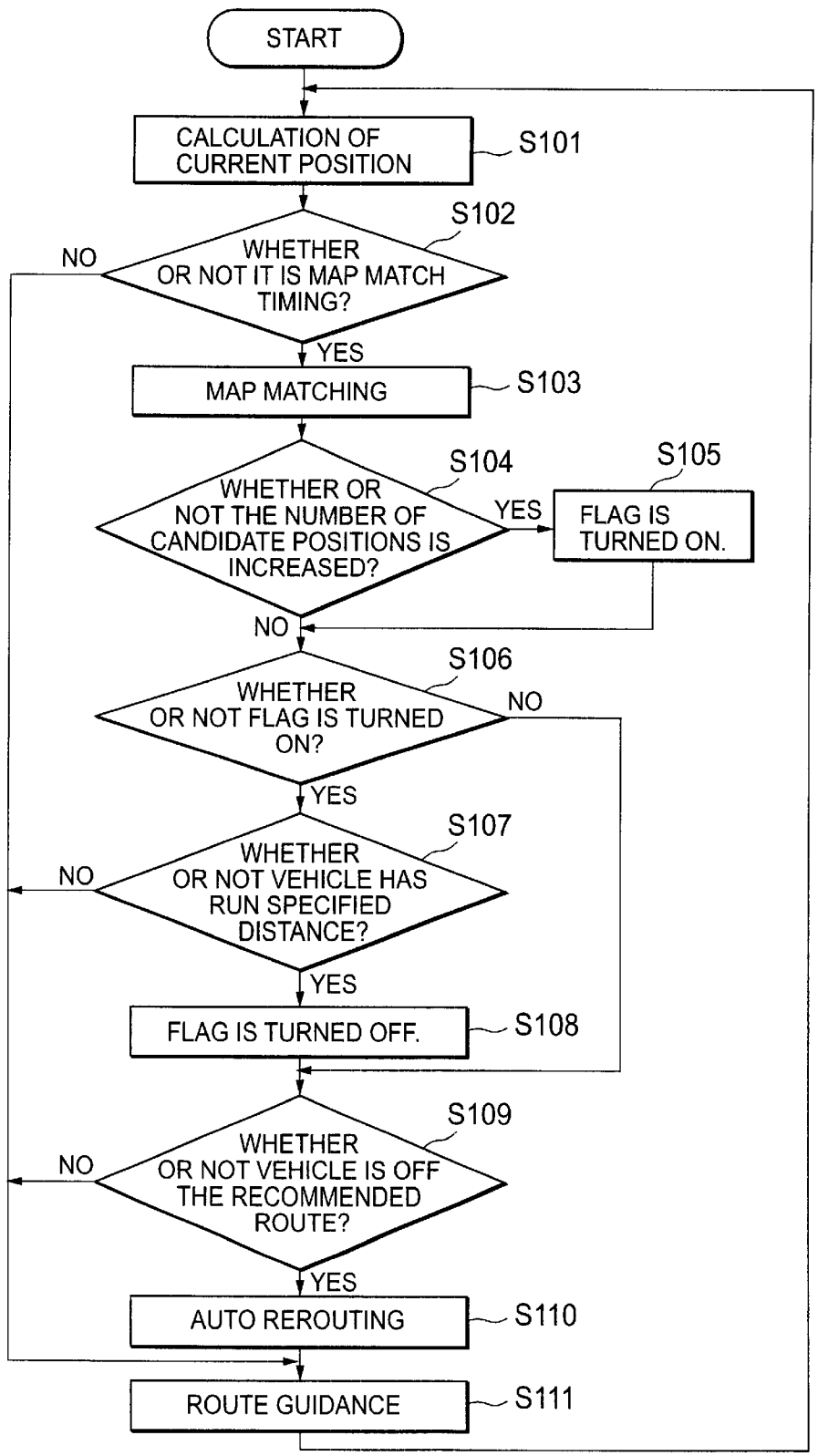
FIG. 2 is a flow chart for explaining an operation of the navigation device to which the first embodiment of the present invention is applied.

FIG. 2 is a flow chart for explaining an operation of the navigation device to which the first embodiment of the present invention is applied. This flow is started, for example, when a starting point and a destination are set by a user via the input device 4, and a recommended route connecting the starting point with the destination is searched and set. Then, the flow is repeatedly executed until a vehicle reaches the destination, or a cancel of a route guidance is instructed by a user via the input device 4.

First, the current position calculating unit 11 calculates a current position and a traveling direction of a vehicle by using data outputted from the GPS receiver 6 and the various kinds of sensors 5 and 7 (step S101).

Next, the map matching unit 12 judges whether it is time for performing a map matching to the current position calculated by the current position calculating unit 11 (step S102). For example, if the map matching is performed every 20 meters of running, the map matching unit 12 judges whether or not the vehicle has run 20 meters since the last map matching was performed.

Herein, when it is not yet the time for map match timing, the processing advances directly to step Sill, and the route guidance unit 132 performs the route guidance described above by using the current position and the traveling direction of the vehicle calculated in step S101 and the recommended route set by the route searching unit 131. Thereafter, the processing returns to step S101.

On the other hand, when it comes the time for map match timing in step S102, the processing advances to step S103, and the map matching unit 12 performs the above-described map matching process on the current position of the vehicle calculated in step S101. Thereafter, the processing advances to step S104.

In step S104, the route guidance unit 132 judges whether or not the number of candidate positions of the map matching process, performed in step S103, is increased and larger than the number of candidate positions of the map matching process previously performed. As described above, when the number of candidate positions registered in the map matching unit 12 is increased, it indicates that the number of roads within a specified range is increased more than the number of the current position of the vehicle searched by the current position calculating unit 11. Therefore, in this case, the possibility of the vehicle approaching in the vicinity of a junction is high. Then, when the number of candidate positions is increased, the vehicle is judged as having approached in the junction, the processing advances to step S105, and a flag for prohibiting auto-rerouting turns ON. Thereafter, the processing advances to step S106. On the other hand, when the number of candidate positions is not increased, the processing advances directly to step S106 without executing step S105.

In the step S106, the route guidance unit 132 judges whether or not the flag for prohibiting auto-rerouting is turned ON. When the flag is ON, specifically, when auto-rerouting is prohibited, the processing advances to step S107, and it is judged whether or not the vehicle has run a specified distance (for example, 1000 meters on a high way, and 400 meters on an open road) since the flag was turned ON. When the vehicle has run the specified distance, it is judged that the vehicle is off the vicinity of the junction, the flag is turned OFF to cancel the prohibition of auto-rerouting (step S108), and the processing advances to step S109. On the other hand, when the vehicle has not run the specified distance, the processing advances directly to step S111, and the above-described route guidance is performed by using the set recommended route and the traveling direction of the vehicle and the recommended route corrected by the map matching process. Thereafter, the processing returns to step S101.

In the step S106, when the flag is OFF, specifically, when auto-rerouting is not prohibited, the processing advances to step S109 without performing the above-described steps S107 and S108, and it is judged whether or not the current position of the vehicle corrected by the matching process in step S103 is on the recommended route. Then, when it is on the recommended route, the processing advances to step S111, and the above-described route guidance is performed by using the recommended route, the traveling direction and current position of the vehicle corrected by the matching process. Thereafter, the processing returns to step S101. On the other hand, when the current position of the vehicle is not on the recommended route, the above-described auto-rerouting is performed by setting the current position of the vehicle corrected by the matching process as a starting point, and a new recommended route is set. Thereafter, the processing advances to step S111, and the above-described route guidance is performed by using the newly set recommended route, the traveling direction of the vehicle, and the current position corrected by the matching process. Then, the processing returns to step S101.

Hereinabove, the description has been made for the first embodiment of the present invention.

In this embodiment, as described above, when the vehicle running on the recommended route approaches the vicinity of the junction, auto-rerouting is prohibited until the vehicle runs the specified distance. By conforming to the foregoing, a situation can be prevented from occurring, in which auto-rerouting is executed for every position skipping of the current position of the vehicle in the map matching in the vicinity of a junction where a position skipping of the current position of the vehicle is likely to occur, and a different recommended route is suggested to a user.

Note that, in the above-described embodiment, a judgement whether or not the vehicle running on the recommended route approaches in the vicinity of a junction, is made based on whether or not the number of candidate positions in the map matching process increases. However, the judgement may be performed, for example, by previously setting information concerning junctions on road map data stored in the storage medium 8, obtaining the information of the junctions on the recommended route from the storage medium 8 by the route guidance unit 132, and judging whether or not the current position of the vehicle calculated by the current position calculating unit 11 reaches any junction whose information is obtained.

Next, a description will be made for a second embodiment of the present invention.

In the above-described first embodiment, it is made a condition for canceling the prohibition of auto-rerouting that the vehicle runs a specified distance (for example, 1000 meters on a high way, and 400 meters on an open road) after auto-rerouting is prohibited. This is because it is considered that, in the vicinity of a junction, unless the vehicle runs a certain distance, the superiority and inferiority of a correlation between each candidate position registered by the map matching unit 12 and the current position of the vehicle calculated by the current position calculating unit 11 is not clear.

However, even if the vehicle does not run the specified distance, the superiority and inferiority of the correlation between each candidate position registered in the map matching unit 12 and the current position of the vehicle calculated by the current position calculating unit 11 is clear in some cases depending on the road configuration in the vicinity of the junction.

Figure 3:
FIG. 3 is a view for explaining a principle of an azimuth difference evaluation value L used in a second embodiment of the present invention.
Figure 3:
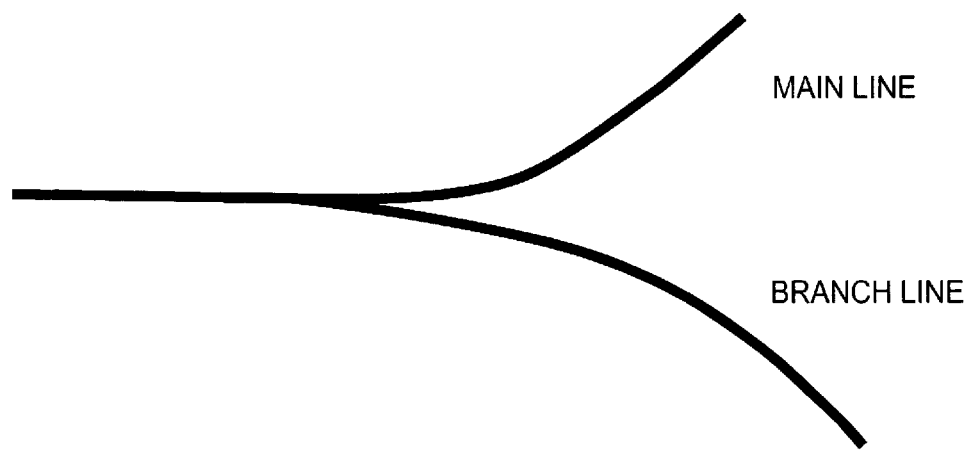

For example, in FIG. 3, as shown in (a), when an angle made by a main line with a branch line at a junction is narrow and the both lines are approximately parallel to each other (when an azimuth difference of a road is small), if a vehicle does not run a certain distance, the superiority and inferiority of the correlation between each candidate position registered in the map matching unit 12 and a current position of the vehicle calculated by the current position calculating unit 11 is not clear. However, as shown in (b), when an angle made by a main line with a branch line becomes gradually large (when an azimuth difference of a road is large), even if a vehicle does not run a certain distance, the superiority and inferiority of the correlation between each candidate position registered in the map matching unit 12 and a current position of the vehicle calculated by the current position calculating unit 11 is clear.

Then, in this embodiment, an evaluation value (an azimuth difference evaluation value) is introduced, whose value decreases (or increases) as the superiority and inferiority of the correlation between each candidate position registered in the map matching unit 12 and a current position of the vehicle calculated by the current position calculating unit 11 is clear. When the evaluation value becomes smaller (or the evaluation value becomes larger) than a specified threshold, even if the vehicle does not run a specified distance after auto-rerouting is prohibited, the prohibition of the auto-rerouting is canceled.

A schematic construction of the navigation device, to which the second embodiment of the present invention is applied, is identical to a schematic construction of the navigation device to which the first embodiment of the present invention shown in FIG. 1 is applied. However, in this embodiment, an azimuth difference evaluation value L is introduced, whose value decreases as the superiority and inferiority of the correlation between each candidate position registered in the map matching unit 12 and a current position of the vehicle calculated by the current position calculating unit 11 is clear, and the azimuth difference evaluation value is calculated every time when the map matching is performed by the map matching unit 12 from the time when a flag indicating the prohibition of the auto-rerouting is turned ON to the time when the flag is turned OFF in the route guidance unit 132. And when the azimuth difference evaluation value is zero or less, even if the vehicle does not run a specified distance, the flag is turned OFF to cancel the prohibition of the auto-rerouting.

Herein, a calculating formula of the azimuth difference evaluation value L will be illustrated.

$$L = T - (dcar \times 10 + \Sigma \theta \times G)$$

Note that in the above-described formula, T is a specified initial value which is set to 3000 by the inventors of the present invention, and G is an arbitrary factor which is set to 11/10 by the inventors of the present invention. Dcar is a running distance (m) after the flag is turned ON. Since the azimuth difference evaluation value L is calculated every time when the map matching is performed, the azimuth difference evaluation value L can be obtained by checking how many times the map matching is performed after the flag is turned ON. For example, when the map matching is performed every 20 meters of running, and assuming that the number of map matchings performed after the flag is turned ON is N, dcar=20 N is obtained. a is a difference (a road azimuth difference) between a road azimuth at a current position of a vehicle on a road, which has the current position of a vehicle corrected by the map matching, and a road azimuth at a corresponding candidate position of a road, which has each candidate position registered by the map matching and is other than the road having the corrected current position of the vehicle. Information concerning the road azimuth can be obtained from the map data stored in the storage medium 8. Note that, when the number of candidate positions registered by the map matching is three or more, the road azimuth difference θ becomes two or more. Accordingly, the azimuth difference evaluation value L also becomes two or more. In this case, only if all azimuth difference evaluation values L are zero or less, the flag is turned OFF and a prohibition of the auto-rerouting is canceled.

Next, a description will be made for an operation of the navigation device to which the second embodiment of the above-described structure of the present invention is applied.

Figure 4:
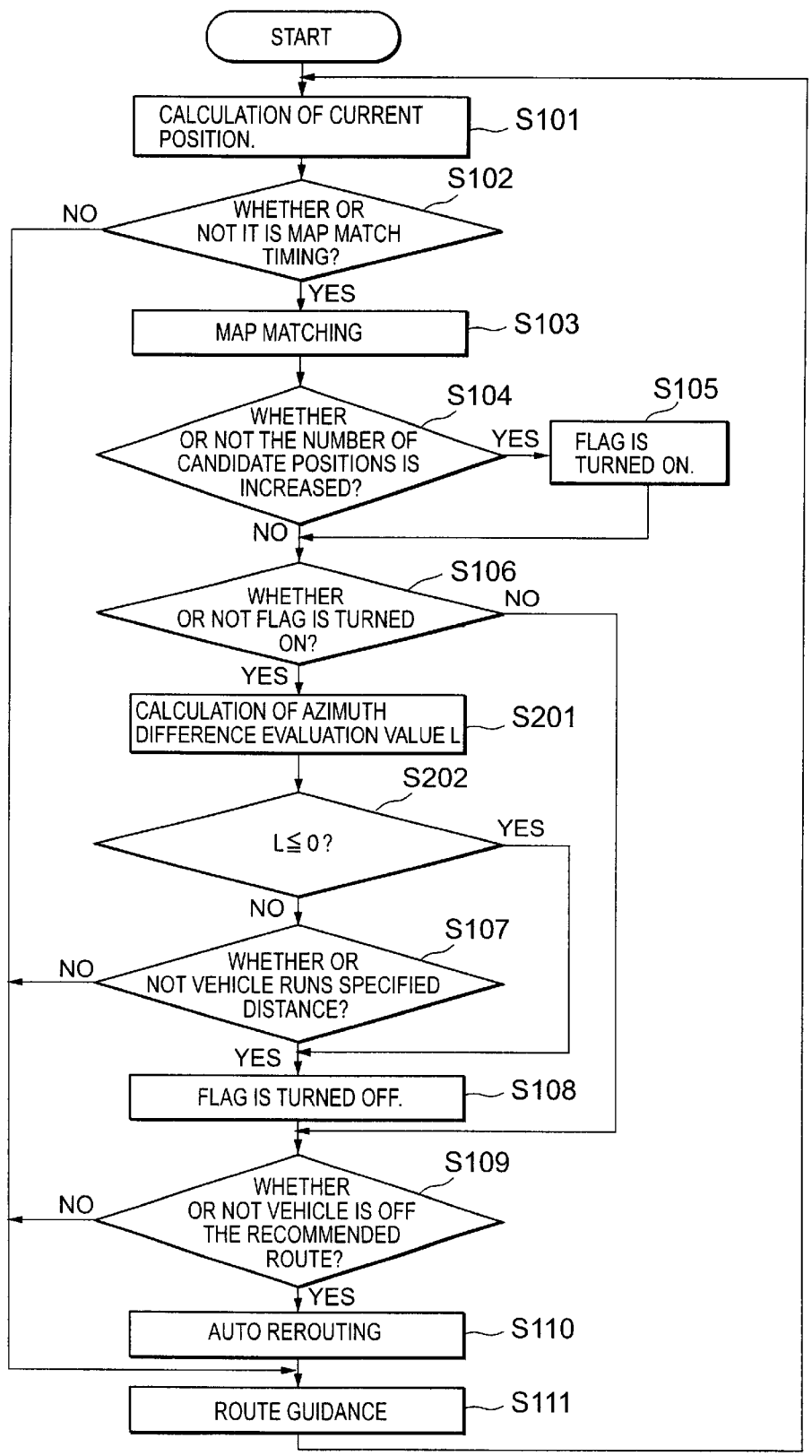
FIG. 4 is a flow chart for explaining an operation of the navigation device to which the second embodiment of the present invention is applied.
Figure 5:
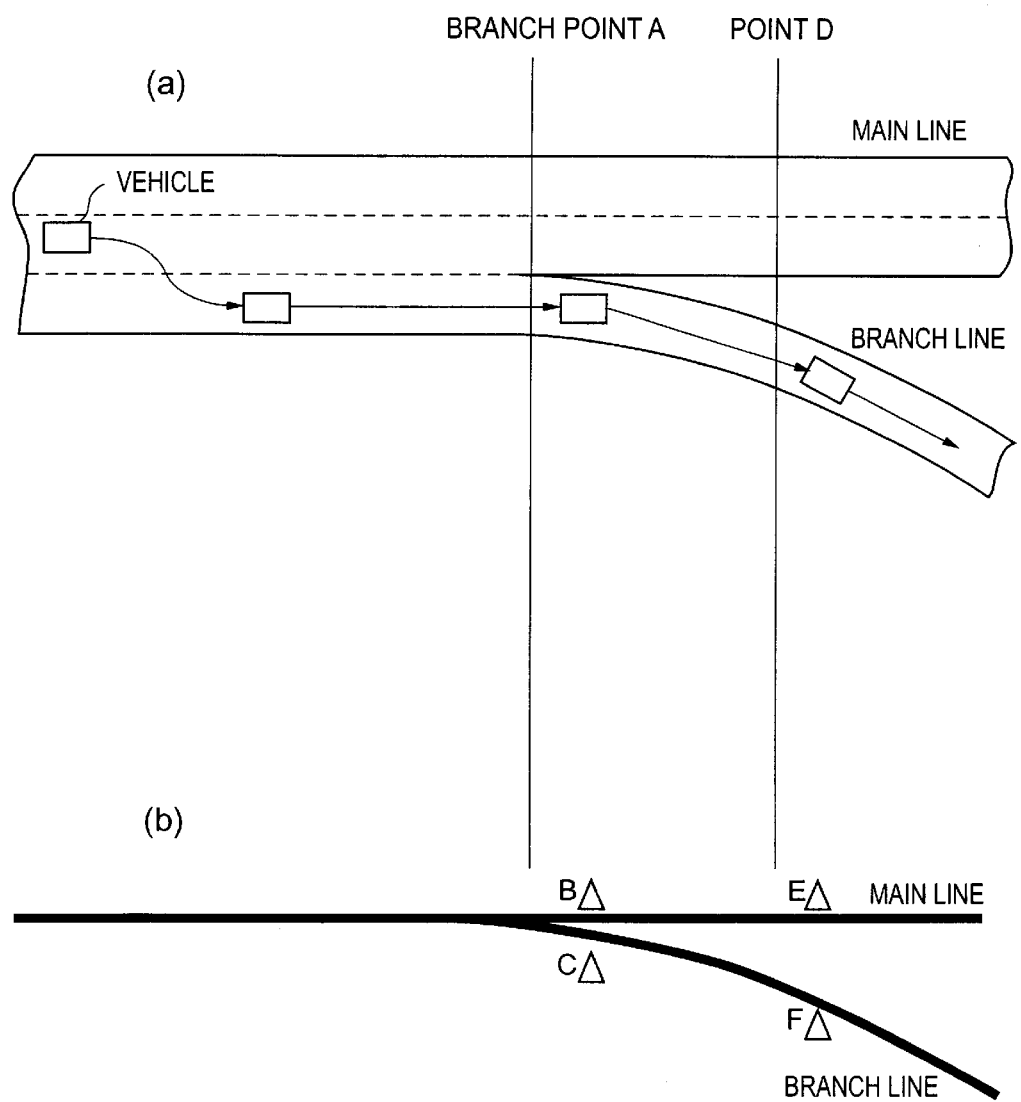
FIG. 5 is a view for explaining a position skipping phenomenon in an on-board navigation to which a map matching technology is applied.

FIG. 4 is a flow chart for explaining an operation of the navigation device, to which the second embodiment of the present invention is applied. This operation flow differs from that of the first embodiment shown in FIG. 2 in that step S201 and 202 are added. With respect to other steps, this operation flow is identical to that of the first embodiment shown in FIG. 2.

Specifically, in this embodiment, when it is judged that a flag for prohibiting auto-rerouting is turned ON by a route guidance unit 132 in step S106, the processing advances to step S201, and the route guidance unit 132 calculates the above-described azimuth difference evaluation value L. Then, the processing advances to step S202. In step S202, the route guidance unit 132 judges whether or not the calculated azimuth difference evaluation value L is zero or less. When the value is zero or less, the processing advances to step S108 without performing step S107, and the flag is turned OFF. On the other hand, when the calculated azimuth difference evaluation value is more than zero, the processing advances to step S107.

In the foregoing, the description has been made for the second embodiment of the present invention.

In this embodiment, as described above, an azimuth difference evaluation value is introduced whose value decreases as the superiority and inferiority of the correlation between each candidate position registered in the map matching unit 12 and the current position of the vehicle calculated by the current position calculating unit 11 is clear. When the evaluation value is zero or less, even if a vehicle does not run a specified distance after the flag is turned ON, the flag is turned OFF. Therefore, a situation can be more efficiently prevented from occurring, in which auto-rerouting is executed for every position skipping of the current position of the vehicle in the map matching in the vicinity of a junction where a current-position skipping of a vehicle is likely to occur, and then a different recommended route is suggested to a user.

As described above, according to the present invention, it becomes possible to prevent the frequent execution of the auto-rerouting in the vicinity of a junction where a current-position skipping of a vehicle due to map matching is likely to occur.

What is claimed is:

1. A route guidance device, in which a recommended route from a set starting point to a set destination is searched to be submitted to a user; and, when a current position of a vehicle deviates from said recommended route, a recommended route from the current position of the vehicle to the destination is newly searched to be submitted to the user, said route guidance device comprising:

data storing means for storing road map data;

current position measuring means for measuring a current position of a vehicle;

map matching means for correcting the current position of the vehicle measured, for each specified interval, by said current position measuring means so as to be located on any road in a specified range from the current position among roads determined by the road map data stored in said data storing means; and auto-rerouting preventing means for preventing a search for a new recommended route from the corrected current position of the vehicle to the destination even if the current position of the vehicle is corrected by said map matching means and deviates from said recommended route resultantly when the current position of the vehicle measured by said current position measuring means is in the vicinity of a junction on said recommended route among the roads determined by the road map data stored in said data storing means.

2. The route guidance device according to clam 1, wherein said auto-rerouting preventing means searches the junction on said recommended route, said junction being near the current position of the vehicle measured by said current position measuring means, among junctions of the roads determined by the road map data stored in said data storing means, and judges that the current position of the vehicle is in the vicinity of the junction on said recommended route among the roads determined by the road map data stored in said data storing means when the current position of the vehicle is within a specified distance from the junction in a traveling direction of the vehicle.

3. The route guidance device according to claim 1, wherein said auto-rerouting preventing means judges that the current position of the vehicle is in the vicinity of the junction on said recommended route among the roads determined by the road map data stored in said data storing means from the time when the number of roads selected as to be within a specified range from the current position of the vehicle measured by said current position measuring means is increased to the time when the vehicle moves a specified distance in said map matching means.

4. The route guidance device according to claim 3, wherein said auto-rerouting preventing means releases prevention of the search for a new recommended route from the corrected current position of the vehicle to the destination in the case where the current position of the vehicle is corrected, even when the vehicle has not moved said specified distance, by said map matching means and deviates from said recommended route resultantly when a value exceeds a predetermined reference value in said map matching means, said value being determined by a running distance of the vehicle from the time when said current position of the vehicle is in the vicinity of the junction on said recommended route and by an azimuth difference between a plurality of the roads selected as to be within the specified range from the current position of the vehicle measured by said current position measuring means.

* * * * *